United States Patent
Drake

[15] 3,664,514
[45] May 23, 1972

[54] LOCK FOR HINGED RACK

[72] Inventor: King B. Drake, Los Angeles, Calif.
[73] Assignee: Dracon Industries, Chatsworth, Calif.
[22] Filed: Mar. 2, 1970
[21] Appl. No.: 15,506

[52] U.S. Cl. ..............................................211/169, 16/144
[51] Int. Cl. .........................................................A47f 5/02
[58] Field of Search ...............211/169, 169.1, 4, 86; 16/144, 16/143, 141, 139, 147, 146; 292/DIG. 9, DIG. 17

[56] References Cited

UNITED STATES PATENTS

| 579,277 | 3/1897 | Lord et al. | 16/146 UX |
| 649,387 | 5/1900 | Wright | 16/146 |
| 760,739 | 5/1904 | Huguley | 16/144 |
| 1,171,188 | 2/1916 | Goss | 16/144 |
| 1,679,513 | 8/1928 | Brown | 16/144 UX |
| 2,024,039 | 12/1935 | Harting | 16/144 UX |
| 2,730,322 | 1/1956 | Haberland et al. | 211/169 X |
| 3,468,429 | 9/1969 | Drake | 211/169 |

FOREIGN PATENTS OR APPLICATIONS

| 27,638 | 3/1932 | Netherlands | 16/144 |
| 8,400 | 6/1900 | Norway | 16/144 |

Primary Examiner—Ramon S. Britts
Attorney—Allan M. Shapiro

[57] ABSTRACT

A rack for heavy equipment is hinged on a post and the lock is secured therebetween. A finger extends from the rack into an opening in the post and engagement means secures the finger with respect to the post to lock the rack with respect thereto. In the preferred embodiment, the finger is a curved channel having openings in its web and the engagement means is a plunger which selectively engages the web openings.

6 Claims, 11 Drawing Figures

PATENTED MAY 23 1972 3,664,514
SHEET 1 OF 2
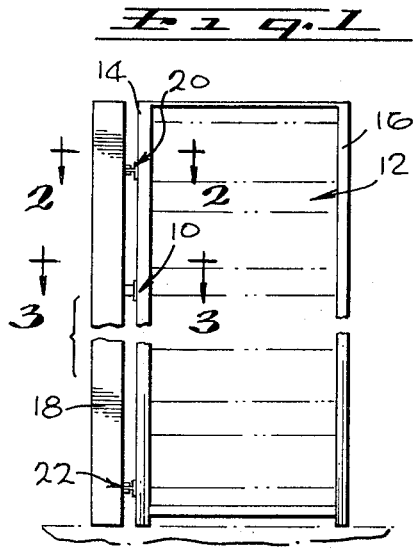
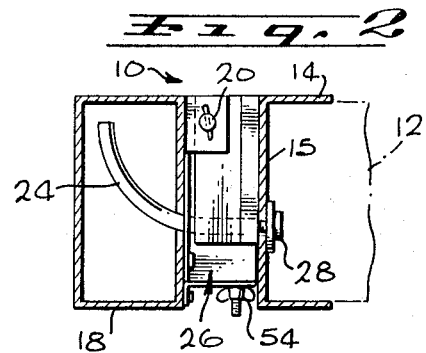
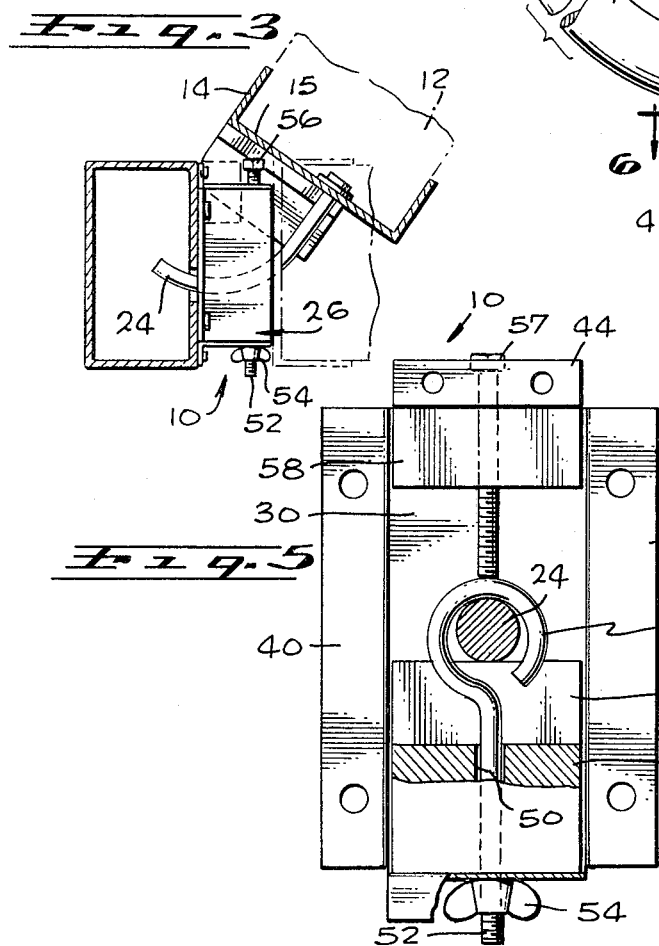
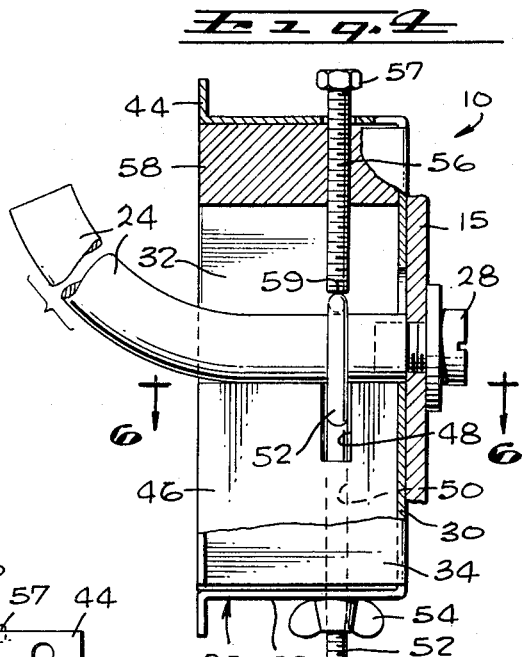
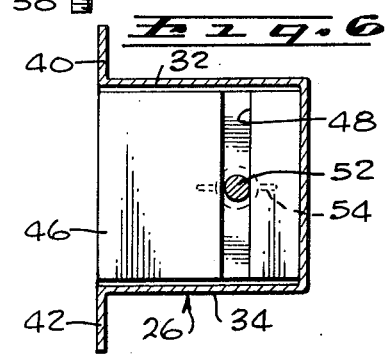
INVENTOR.
KING B. DRAKE
BY Allan M. Shapiro
ATTORNEY

PATENTED MAY 23 1972

KING B. DRAKE
INVENTOR.

BY Allan M. Shapiro

ATTORNEY

LOCK FOR HINGED RACK

BACKGROUND OF THE INVENTION

1. Field of the Invention

This invention is directed to a lock for a hinged rack and, particularly, a lock which can hold or retain a hingedly-mounted rack for heavy equipment in any desired position.

2. Description of the Prior Art

Heavy equipment is employed in many different situations. In a number of these situations, maintenance requirements call for access to both sides of the equipment. Such is especially true when the equipment is electrical in nature, and electric connections or components are accessible from both sides of the equipment. Thus, the equipment is mounted in a hinged rack so that the equipment may be hingedly swung for access to both sides thereof. In laboratories where racks of electronic equipment are employed, and particularly in telephone situations wherein switching relays and other components necessary for telephonic communication are secured into rack configuration, such panels are most convenient and space-saving when hingedly mounted. Especially in the telephone field where auxiliary equipment is employed in connection with terminal wiring, reliability is so great that access to the equipment is not often required, but is usually required only for reconnection of subscribers' telephones. Thus, equipment can be positioned in such a manner that it is close to an adjacent wall to conserve floor space and still have the side toward the wall available for access through the employment of hinges on the rack of the telephone equipment. By this means, equipment may be swung out from the wall for access to the back thereof, and swung back to the wall for conservation of space. Such a hinged equipment rack is exemplified by that disclosed in U.S. Pat. No. 3,468,429 entitled "Telephonic Equipment Rack."

While the rack of heavy equipment described with respect to this invention is a hinged rack of telephone equipment because of its particular utility therewith, it is clear that the lock for the hinged rack of this invention will have comparable utility with racks of a similar nature.

SUMMARY OF THE INVENTION

In order to aid in the understanding of this invention, it can be stated in essentially summary form that it is directed to a lock for a hinged rack. The rack is hingedly mounted on a post. The lock comprises a finger which is mounted upon the rack and extends into an opening in the post. Post-mounted engagement means locks the finger with respect to the post, thus locking the rack with respect to the post. In the preferred embodiment, the finger has openings therein and the engagement means engages in the openings. In further detail, the preferred embodiment comprises an arcuate finger having holes therethrough, and the engagement means on the post is a plunger which engages the holes.

Accordingly, it is an object of this invention to provide a lock for a hinged rack, and particularly a hinged rack of heavy equipment so that the heavy equipment rack may be locked in any desired position. It is another object to provide a lock having a finger and a body, with the finger and the body attached to the rack and to the post on which the rack is hinged. It is a further object of this invention to provide for a finger secured to the rack and engagement means secured to the post so that, when the engagement means engages the finger, the rack is secured with respect to the post. It is still another object to provide a finger which has holes therein, and the engagement means selectively engages a hole to lock the finger with respect to the post. It is a further object to provide a plunger which selectively engages in the holes in the finger to selectively lock the finger with respect to the post. It is another object to provide another embodiment wherein the lock finger is in the form of an unperforated arcuate rod secured to the rack. It is still another object of this invention to provide a lock body which has a loop therein, which loop engages around the lock finger so that, upon tightening of the loop, the finger is restrained. It is still another object to provide the loop in the form of an eyebolt with means to tighten the eyebolt upon the finger.

Still other objects, features and attendant advantages of the present invention, together with various modifications, will become apparent to those skilled in the art from a reading of the following detailed description of the preferred embodiments constructed in accordance therewith, taken in conjunction with the accompanying drawings wherein like numerals designate like parts in the several figures.

BRIEF DESCRIPTION OF THE DRAWINGS

FIG. 1 is a front elevational view of a hinged rack, showing the first embodiment of the lock of this invention in association therewith.

FIG. 2 is an enlarged horizontal section through the rack and associated post taken along the line 2—2 of FIG. 1.

FIG. 3 is a sectional view similar to FIG. 2, but taken along the line 3—3 in FIG. 1 and showing the lock with the hinged rack in another hinge position.

FIG. 4 is a top plan view, further enlarged and with parts broken away and sectioned, of the first embodiment of the lock of this invention.

FIG. 5 is a side elevational view as seen from the left in FIG. 4, partly broken away and sectioned.

FIG. 6 is a section of the lock taken substantially along the line 6—6 of FIG. 4.

DESCRIPTION OF THE PREFERRED EMBODIMENT

Figure 8:
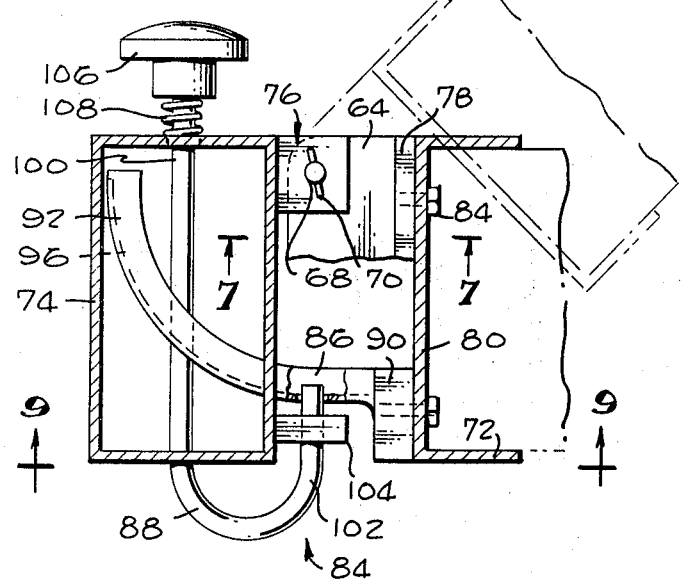
FIG. 8 is a horizontal section through a part of the rack and through the post, showing the preferred embodiment of the lock of this invention.

Referring to the drawings, and particularly to FIG. 1 initially, the first embodiment of the lock of this invention is generally indicated at 10. Lock 10 is particularly useful for the securement into angular position of a rack which is mounted in hinged fashion upon a fixed frame or post. In the present case, rack 12 is a rack of telephone equipment, which may include relays, ringing timers, terminal boards and the like, and is of the type illustrated in said copending application. Rack 12 has upright frame members 14 and 16 which define the sides of the rack. As is illustrated, frame member 14 is mounted to post 18 by means of hinges 20 and 22. Thus, rack 12 is hingedly mounted with respect to post 18 upon the axis of hinges 20 and 22.

Lock 10 comprises finger 24 and locking means, or lock body 26. Finger 24 is a metal rod of generally circular cross section. It is curved through most of its length to lie substantially in an arc around the pivot axis of hinges 20 and 22. One end of finger 24 is secured by means of screw 28 to the web 15 of frame member 14. A clearance hole for screw 28 is formed in the web 15 of frame member 14, and screw 28 passes therethrough. The adjacent end of finger 24 is threaded so that screw 28 is threadably engaged therein to secure finger 24 against the outer surface of frame member web 15. Accordingly, finger 24 moves with rack 12 in its rotative motion about the axis of hinges 20 and 22.

Lock body 26 is preferably formed from flat sheet material into a rectangular box by appropriate cutting and bending. As best seen in FIGS. 4, 5 and 6, lock body 26 is formed of top 30 from which depend sides 32 and 34 and ends 36 and 38. At least the two sides 32 and 34 and top end 36 have outwardly extending flanges or feet, respectively indicated at 40, 42 and 44. These flanges have openings therethrough by which the lock body can be secured to post 18 by the application of suitable fasteners such as screws or bolts.

Positioned interiorly of the rectangular box, which forms the outer definition of the lock body, is clamp block 46. Clamp block 46 has a slot 48 therein. Hole 50 extends from the bottom of slot 48 through the lower part of the clamp block 46. Clamp 52 is in the form of an eyebolt having an eye at its upper end and a straight shank which is threaded at its outer end. Clamp 52 is positioned so that a portion of its eye extends into slot 48, while its straight shank extends through hole 50 in block 46. Furthermore, its straight shank extends through an opening in end 38 of the rectangular box portion of the lock body. Nut 54 is threadedly engaged with the threaded portion of the shank of clamp 52. As indicated, nut 54 is preferably a wing nut or some other type of nut which is conveniently finger operable by the user of the equipment.

The size of the eye on clamp 52 is larger than the diameter of finger 24 and so related thereto that, when the eye embraces the finger, as is shown in FIGS. 4 and 5, tightening of nut 54 draws the eye into slot 48 to clamp the finger 24 against the side of clamp block 46. This tightening causes clamping of the finger with respect to the block and thus causes clamping between frame member 14 and hinge post 18. Thus, the rack 12 is clamped into position by the tightening of nut 54. Additionally, it must be noted that, since the eye on clamp 52 engages on finger 24 throughout the entire hinge motion, the clamp is effective at any angular position between the frame and its hinge post 18.

Finger 24 is illustrated as extending 90° to permit the clamping of rack 12 at any position within the limits of a right angle, but it is equally clear that finger 24 can be extended for a further length to provide for clamping over an additional angle. 90° is chosen as an end limit for finger 24 because such is normally the practical limit for the swinging of a rack 12. Since the rack 12 is conventionally an electrical rack, the wires interconnecting the components on the rack with stationarily mounted components or cables on the stationary structure, limit practical motion to a maximum of 90°. For this reason, in this embodiment, this is a reasonable and practical limit of motion. Furthermore, FIG. 3 illustrates that hinge post 18 is a rectangular tube. An opening in the side wall of the tube permits finger 24 to enter therethrough when the rack is swung to the position shown in FIG. 2. However, the side of post 18 limits the length of the finger to approximately the 90° limits heretofore described. This is a practical limit of swing but, if more swing is required, a hole can be located in the post to accommodate a longer finger.

Nut 54 is accessible for clamping of clamp 52 against the block 46 from one side of the structure. In order to provide further versatility, the clamp can also be engaged by application of bolt 56 in the other side of the clamp body. Bolt 56 preferably is provided with a slotted hex head 57 and is suitably threaded through nut 58, which is in the form of a block suitably secured inside one end of the lock body. The free end 59 of bolt 56 engages abuttingly against the eye of clamp 52. Thus, by tightening bolt 56, which serves as an operating rod, the clamp 52 again engages upon finger 24 to lock the finger in relative position for locking the hinged rack with respect to the post on which it is hinged.

In view of the fact that a locking force applied by bolt 56 has a tendency to separate and bend up top panel 36, the top panel has a flange foot 44 thereon which has holes therein for the securement of that flange with respect to post 18, and thus with respect to the remainder of lock body 26. As is seen in FIGS. 2 and 3, securing means, such as screws or bolts engaging through flanges 40 and 42, secure the lock body to post 18. It is additionally seen in FIGS. 2 and 3 that suitable securing means through the openings in flange 44 secure this portion also to post 18. By this means, rigid structure is obtained by which clamping with bolt 56 is feasible. Thus, when clamp bolt 56 is tightened for firm tightening of the eye on finger 24, no spreading of the structure occurs because the relative parts are firmly secured.

Figure 7:
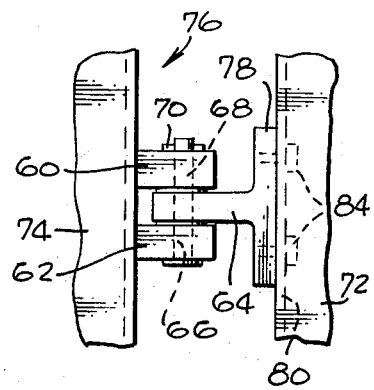
FIG. 7 is an enlarged front elevational view of a suitable hinge between the rack and the post, useable with the lock of this invention, as seen generally along the line 7—7 of FIG. 8.

Hinge 76, which is identical to hinge 20, is shown in detail in FIG. 7. Hinge 76 comprises hinge fingers 60 and 62, which are mounted upon post 74 and between which extends hinge finger 64, which is mounted upon frame member 72. An aligned hole 66 extends through all three of the fingers and contains hinge pin 68. Cross pin 70 retains the hinge pin in place. Hinge finger 64 stands out from base flange 78, which lies against web 80 of frame member 72. Bolts 84 through web 80 and base flange 78 firmly retain hinge finger 64 in place to form a rigid structure so that the hinged rack accurately swings upon the axis defined by the hinges.

A proper hinge is essential to proper operation of the first embodiment described above and to the preferred embodiment described below. In each of these embodiments, an arcuate finger is secured to the frame of the hinge rack and extends in an arc, which is positioned at a substantially constant radius with respect to the hinge axis. Proper hinging is accomplished by a hinge of the nature shown in FIG. 7.

Figure 9:
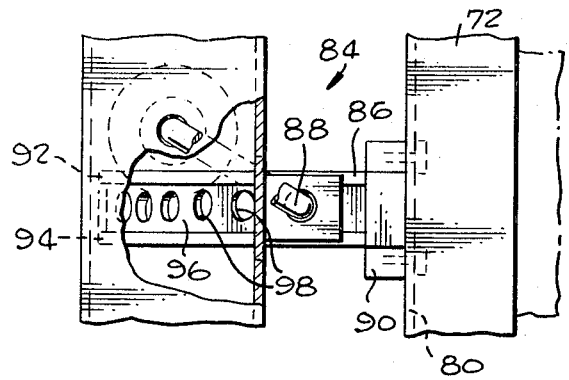
FIG. 9 is a front elevational view, with parts broken away, taken generally along the line 9—9 of FIG. 8.

In FIGS. 8 and 9, the hinged rack has a frame member 72 which is hingedly mounted upon post 74 by a pair of hinges, one of which is seen at 76. The preferred embodiment of the lock of this invention is generally indicated at 84 in FIGS. 8 and 9. Lock 84 comprises finger 86 and locking means 88. Finger 86 has a base 90, which is secured to web 80 of frame member 72 by any conventional means, such as the bolts illustrated in FIGS. 8 and 9. The principal length of finger 86 is radially positioned with respect to the axis of hinge 76 and extends substantially 90° circumferentially with respect to that axis. The cross section of finger 86 is in the form of a channel having flanges 92 and 94 and web 96. The flanges are directed radially outward with respect to the web and serve as guides for the locking means 88, as is hereinafter described. A series of radial holes 98 are formed through web 96. The holes are spaced along the circumferential length of the web in such manner as to provide appropriate locking angles for frame member 72.

Locking means 88 is in the form of operating rod 100, which is guided in holes in the front and back of post 74 so that it is free to move only along its own axis. The portion of operating rod 100 which is behind post 74 is bent into a U-shape to form lock pin or plunger 102. Plunger 102 extends through lock member or guide 104 and is aligned with the holes 98 in web 96. The front end of operating rod 100 carries knob 106, and compression spring 108 is positioned between knob 106 and the front surface of post 74. Thus, operating rod 100 is urged outwardly (upwardly as seen in FIG. 8) to urge plunger 102 into engagement with one of the holes 98. By pressing inwardly on knob 106, the plunger 102 is disengaged from the holes to permit swinging of the rack mounted on frame member 72 and, when the knob 106 is released, the spring causes the plunger to be urged toward return engagement with one of the holes 98. Slight swinging of the rack thereupon moves the hole into alignment with the plunger so that the plunger engages therein for locking the rack at the desired angular position. Thus, in use, the operator merely pushes knob 106, swings the rack to the approximately desired position, releases knob 106, and slightly rotates the rack in either direction until the plunger 102 "clicks" into a hole 98.

Figure 10:
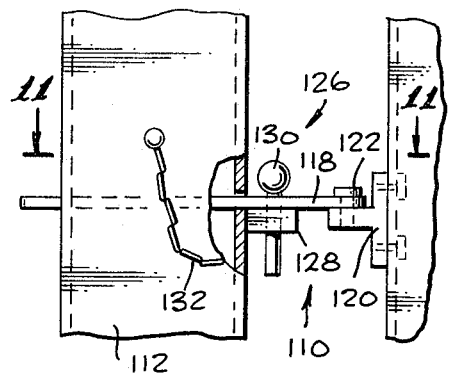
FIG. 10 is a front elevational view, with parts broken away, similar to FIG. 9, showing a third embodiment of the lock of this invention.
Figure 11:
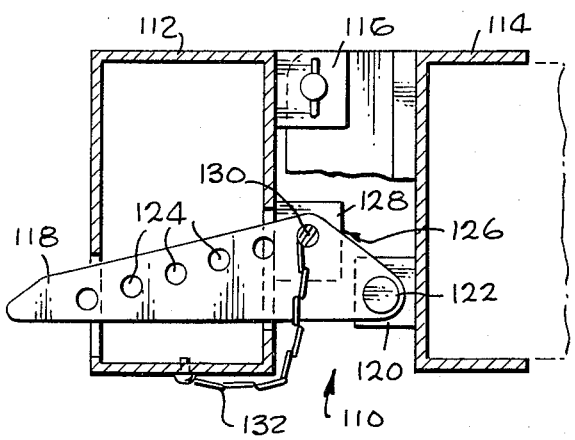
FIG. 11 is a horizontal section taken generally along the line 11—11 of FIG. 10.

Referring to FIGS. 10 and 11, the third species of the lock of this invention is generally indicated therein at 110. Post 112 carries frame member 114 thereon by means of hinge means 116. Again, frame member 114 is part of a hinged rack, similar to the frame members 72 and 14 described above. Hinge means 116 is one of a pair of hinges identical to hinge 76 or 20.

Lock 110 has a finger 118. Bracket 120 is secured to frame member 114 and finger 118 is pivotally mounted thereon by means of pivot pin 122. Finger 118 has a plurality of spaced holes 124 along its length. They are at appropriate spacing to provide proper lock angles for the hinged frame, as is apparent below. Locking means 126 comprises a guide or lock member 128, which is secured to post 112 and plunger or lock pin 130, which is positionable through any selected one of the holes 124 and the hole in lock member 128. Chain 132 retains lock pin 130 in the proper area. Slots through post 112 permit finger 118 to extend therethrough and serve as a rough guide for locking finger 118, so that its holes 124 remain in substantial alignment with the hole in lock member 128. Thus, upon withdrawal of lock pin 130, the hinged rack can be swung to any desired position and the lock pin 130 can then be re-inserted, with only a small angular change in the position of the rack, to lock the hinged rack at the selected angle. In each of the embodiments, the structures are arranged so that the rack can be locked in its position where the frame member and the post are parallel, and swung into selected positions. In the case of the locks 84 and 110, the positioning of the holes is selected to provide the most desirable and useful locking angles.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A lock adapted to releasably secure a hinged rack member in a selected angular position relative to a fixed post member upon which the rack member is hingedly mounted to swing from a position substantially in line with the fixed post member to a position in front of the fixed post member, said lock comprising:

an arcuate finger fixedly mounted upon one of said members and a lock body fixedly mounted upon the other of said members, said arcuate finger having a concave side generally directed toward the axis of hinging of the rack member; and said lock body comprising a clamp block, said arcuate finger lying adjacent said clamp block, and clamp means to clamp said arcuate finger against said clamp block to inhibit motion between said finger and said lock body, said clamp means having an operating rod which operates to clamp and unclamp said arcuate finger with respect to said clamp block, said operating rod extending adjacent the front of said post so that said lock can be controlled from the front of said post.

2. The lock for a hinged rack of claim 1 wherein said clamp means comprises an eyebolt, with the eye of said eyebolt embracing said arcuate finger, a nut on said eyebolt engaging exteriorly of said lock body so that, upon tightening of said nut, said eyebolt clamps said finger against said lock body.

3. A lock adapted to releasably secure a hinged rack member in selected angular position relative to a fixed post member upon which the rack member is hingedly mounted, said lock comprising:

an arcuate finger fixedly mounted upon one of said members and a lock body fixedly mounted upon the other of said members, said arcuate finger having a concave side generally directed toward the axis of hinging of the rack member; and said lock body comprising a clamp block, said arcuate finger lying adjacent said clamp block, and clamp means to clamp said arcuate finger against said clamp block, said clamp means comprising an eyebolt, with the eye of said eyebolt embracing said arcuate finger, a nut on said eyebolt engaging exteriorly of said lock body so that, upon tightening of said nut, said eyebolt clamps said finger against said lock body, said clamp block having a slot therein, said eyebolt lying at least partially within said slot to prevent rotation of said eyebolt with respect to said body.

4. The lock for a hinged rack of claim 3 further including a clamp bolt, said clamp bolt engaging abuttingly against said eye of said eyebolt to urge said eye of said eyebolt to clamp said arcuate finger against said clamp block so that said arcuate finger can be clamped against said clamp block both by said eyebolt and by said clamp bolt.

5. The lock hinge rack of claim 4 wherein said clamp bolt engaging against said eye is engaged through a nut in said lock body, said lock body having a flange thereon to prevent clamping forces on said nut from bending said lock body.

6. The lock hinge rack of claim 1 wherein said lock includes a clamp bolt engaging against said clamp means, said bolt being engaged through a nut within said lock body, said lock body having securement flanges thereon to prevent clamping loads on such nut from distorting said lock body.

* * * * *